United States Patent [19]
Westermeyer

[11] Patent Number: 5,271,245
[45] Date of Patent: Dec. 21, 1993

[54] TWO-STAGE HELICAL OIL SEPARATOR

[75] Inventor: Gary W. Westermeyer, Bluffs, Ill.

[73] Assignee: AC&R Components, Inc., Chatham, Ill.

[21] Appl. No.: 932,668

[22] Filed: Aug. 20, 1992

[51] Int. Cl.$^5$ .............................................. F25B 43/02
[52] U.S. Cl. ........................................ 62/470; 62/84
[58] Field of Search ............................ 62/84, 468, 470

[56] References Cited

U.S. PATENT DOCUMENTS

| | | |
|---|---|---|
| 2,511,967 | 6/1950 | Campbell . |
| 2,665,557 | 1/1954 | Dodson . |
| 3,070,977 | 1/1963 | Kimmel et al. ........................ 62/84 |
| 3,283,532 | 11/1966 | Kocher ................................ 62/84 |
| 3,324,680 | 6/1967 | Cremer ................................ 62/84 |
| 3,778,984 | 12/1973 | Lawser . |
| 4,263,029 | 4/1981 | George . |
| 4,282,717 | 8/1981 | Bonar, II ............................. 62/84 |
| 4,478,050 | 10/1984 | DiCarlo et al. . |
| 4,506,523 | 3/1985 | Di Carlo et al. . |
| 4,690,759 | 9/1987 | Mandy . |
| 5,113,671 | 5/1992 | Westermeyer . |

FOREIGN PATENT DOCUMENTS 294771 10/1991 Fed. Rep. of Germany .

*Primary Examiner*—Ronald C. Capossela
*Attorney, Agent, or Firm*—Hill, Steadman & Simpson

[57] ABSTRACT

The present invention provides an improved oil separator in which the oil/refrigerant mixture is caused to flow through two different filter elements. Each of the filter elements is contained in a separate chamber within the separator. A valve assembly is also provided that selectively permits only oil to flow from the first chamber to an oil collection area in the second chamber. The valve assembly regulates the flow of collected oil to the collection area such that the oil/refrigerant mixture cannot escape from the first chamber except by flowing through the filter element of the second chamber. In one embodiment, the valve assembly can include an elongated oil drain extending from a first end adjacent to an oil drain aperture in a dividing wall separating the first and second chambers to a second, open end. A valve seat is formed on the second end of the oil drain. A ball valve element is provided for selective sealing engagement with the valve seat, and the ball valve element is biased toward engagement with the valve seat by a resilient member. In a preferred embodiment, the invention provides a multi-stage device for separting oil from a gas. The device includes a first chamber having an access opening and containing a first filter element. A second chamber is provided adjacent to the first chamber, and contains a second, replaceable filter element. A passage is formed in the first chamber that leads from the second chamber through the access opening in the first chamber, whereby the second, removable filter element can be removed from the second chamber through the access opening via the passage. The second, replaceable filter element may be removed from the separator by means of an elongate handle member having a first end secured to the replaceable filter element, and a second end disposed adjacent to the access opening in the first chamber.

20 Claims, 1 Drawing Sheet

U.S. Patent        Dec. 21, 1993        5,271,245
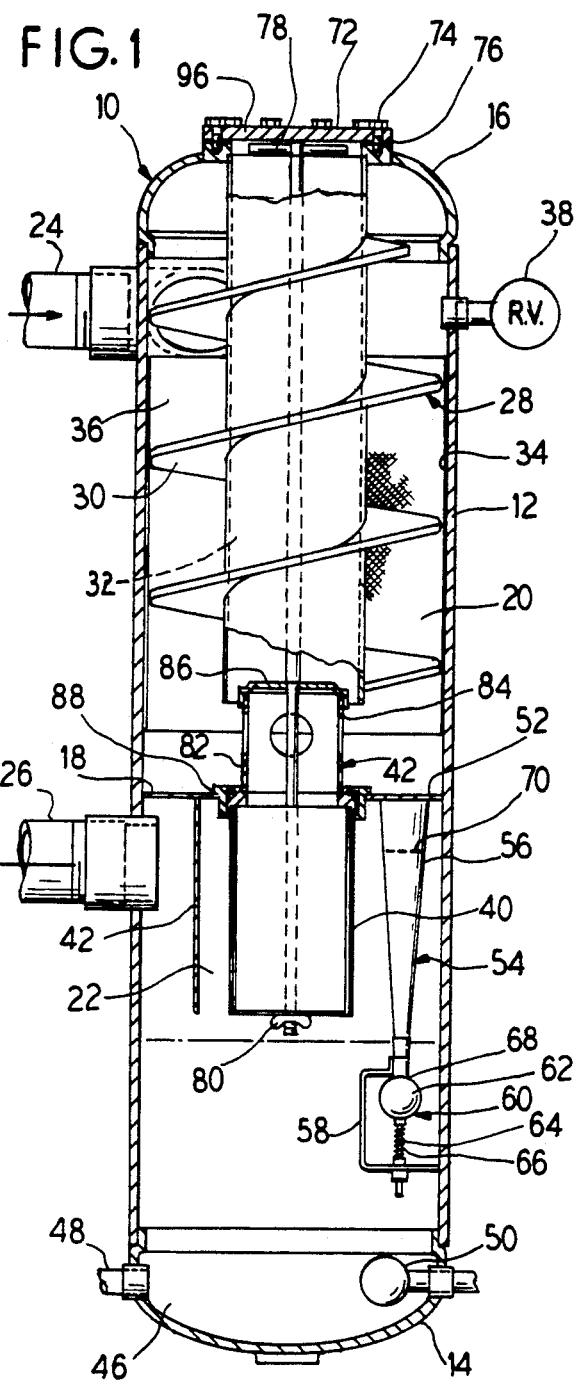
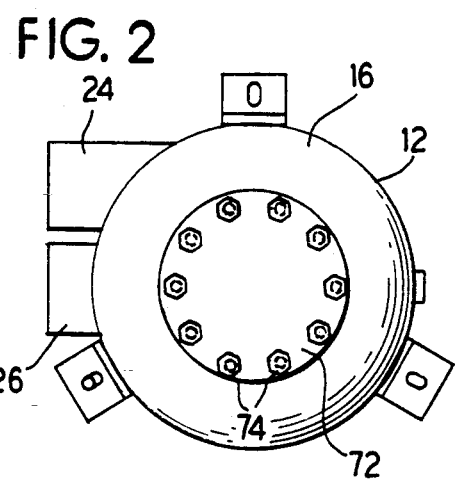
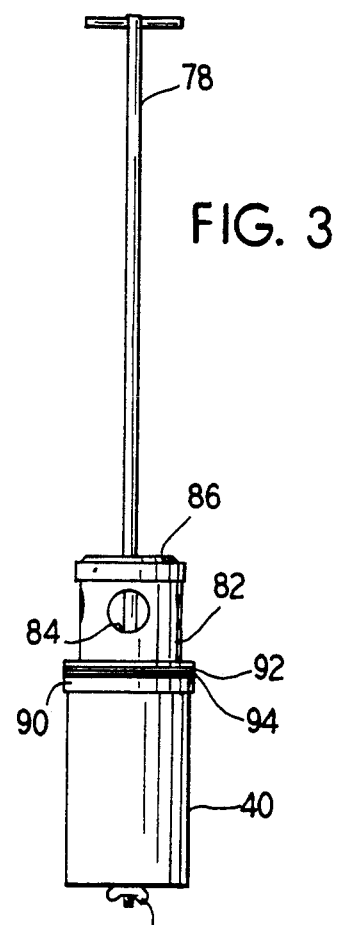
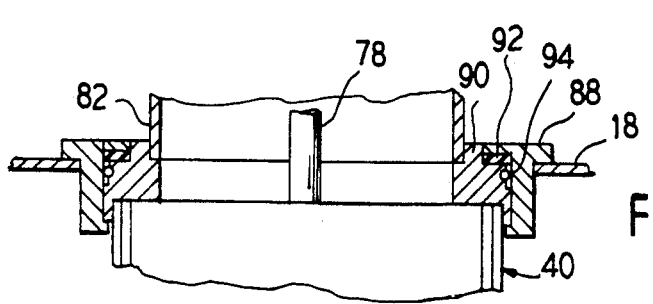

TWO-STAGE HELICAL OIL SEPARATOR

TECHNICAL FIELD

The present invention relates to oil separators and more particularly, to a multiple stage oil separator for use in a refrigeration system to separate oil from an oil/refrigerant gas mixture.

BACKGROUND OF THE INVENTION

Typically, refrigeration systems utilize a compressor to compress a refrigerant gas, a condenser to cool the compressed gas and to cause the gas to condense to a liquid and an evaporator for absorbing heat from the area to be refrigerated as the liquid refrigerant expands and evaporates. In many such systems, oil is used as a lubricant and to provide a more effective seal in the compressor. By such use, oil is mixed with the refrigerant gas in the compressor, and is carried along with the refrigerant. Oil, however, is not a refrigerant; it reduces the efficiency of the system if the oil is permitted to remain mixed with the refrigerant gas as it moves to the condenser. Therefore, it is known to provide an oil separator in the line between the compressor and condenser to remove the oil from the refrigerant gas. Generally, refrigerant gas from the compressor contains oil in the form of a fog as it enters the oil separator inlet.

Various arrangements have been provided for separating the oil from the gas. For example, U.S. Pat. No. 3,778,984 discloses an arrangement for introducing the oil and gas mixture tangentially to a separator so as to centrifuge the oil from the gas so that the oil will fall downwardly under the force of gravity into a collecting chamber in the bottom of the separator. U.S. Pat. No. 4,478,050 discloses an oil separator in which fluid is introduced tangentially in a chamber bounded by a screen upon which the oil particles collect. The oil and refrigerant mixture is caused to flow in a vortex providing centrifugal separation of oil particles. Deflector tabs are provided to enhance or regenerate the vortex in the lower portion of the chamber above oil outlet opening. U.S. Pat. No. 4,263,029 discloses an oil separator in which fluid is introduced tangentially in a passageway formed by a spiral wall having a single revolution. The fluid then passes to a chamber bounded by an annular ring and then to a chamber bounded by a funnel shaped wall with a central opening for passage therethrough of collected oil and including vanes for guiding the oil to the opening. The "oil free" gas leaves the separator through a central, axial passage.

U.S. Pat. No. 5,113,671 discloses an oil separator in which the oil/refrigerant mixture is caused to flow in a generally spiral flow path along the peripheral wall of the oil separator chamber so as to increase the effective path length of the oil/refrigerant mixture along the peripheral wall. A screen mesh is provided along the wall to enhance the separation of oil from the mixture and to provide a collection area for the separated oil. The separated oil drips from the screen to an inverted funnel/baffle which has a plurality of drain holes therethrough to allow the separated oil to drop into an oil collection chamber. A float valve arrangement is provided in the oil collection chamber which permits periodic dispensing of the oil from the chamber to an oil reservoir.

Although some known oil separators provide more than one mode of filtration, they do so in a single filtration chamber. Consequently, such filters cannot filter out oil vapor in increasingly fine, discrete filtration modes. Furthermore, in separators having more than one filter element, it is impossible or difficult at best, to gain access to filter elements for maintenance or replacement.

SUMMARY OF THE INVENTION

The present invention provides an improved oil separator in which the oil/refrigerant mixture is caused to flow through two different filter elements. Each of the filter elements is contained in a separate chamber within the separator. The present invention also provides a valve assembly that selectively permits oil to flow from the first chamber to an oil collection area in the second chamber. The valve assembly regulates the flow of collected oil to the collection area such that the oil/refrigerant mixture cannot escape from the first chamber except by flowing through the filter element of the second chamber.

In a preferred embodiment, the invention provides a multi-stage device for separating oil from a gas. The device includes a first chamber having an access opening and containing a first filter element. A second chamber is provided adjacent to the first chamber, and contains a second, replaceable filter element. A passage is formed in the first chamber that leads from the second chamber through the access opening in the first chamber, whereby the second, removable filter element can be removed from the second chamber through the access opening via the passage. The second, replaceable filter element may be removed from the separator by means of an elongate handle member having a first end secured to the replaceable filter element, and a second end disposed adjacent to the access opening in the first chamber. The elongate handle member may be provided in the form of a "T" handle.

In one embodiment, the valve assembly can include a funnel-shaped oil drain converging from a first end adjacent to an oil drain aperture in a dividing wall separating the first and second chambers to a second, open end. A valve seat is formed on the second end of the funnel-shaped oil drain. A ball valve element is provided which is adapted for selective sealing engagement with the valve seat, and the ball valve element is biased toward engagement with the valve seat by a resilient member, for example, a spring. The valve assembly may be secured to the device by means of a bracket secured to an outer housing of the device. The ball valve element may be mounted for reciprocation by means of a valve guide rod supported for reciprocation by the bracket.

Other objects and advantages of the present invention will be apparent upon reference to the accompanying description when taken in conjunction with the following drawings.

BRIEF DESCRIPTION OF THE DRAWINGS

FIG. 1 illustrates a sectional view of an oil separator embodying the principles of the present invention.

FIG. 2 illustrates a plan view of the oil separator as shown in FIG. 1.

FIG. 3 illustrates an elevational view of the replaceable filter assembly shown in FIG. 1.

FIG. 4 illustrates a sectional detail of the sealed engagement of the replaceable filter element within the oil separator.

DESCRIPTION OF THE PREFERRED EMBODIMENTS

FIG. 1 illustrates an oil separator 10 embodying the principles of the present invention. The oil separator 10 includes an annular, generally cylindrical oil separator housing 12 that is closed by a bottom end cap 14 and a top end cap 16. A dividing wall 18 disposed on the interior of the oil separator 10 divides the oil separator 10 into a first filter chamber 20 and a second filter chamber 22. The oil separator 10 includes an inlet 24 opening into the first filter chamber 20, and gas outlet 26 opening out of the second filter chamber 22. A static auger 28 is secured within the first filter chamber 20. The static auger 28 includes a helical blade or wall 30 that extends spirally outwardly on the exterior of a central annular cylindrical passage 32. The helical blade 30 of the static auger 28 is sized to be closely adjacent to or in contact with a steel mesh screen 34 that lines an inside surface of the first filter chamber 20. The screen 34 extends to the dividing wall 18. The helical blade 30 is spaced from an interior surface of the oil separator housing 12 such that a helical flow path 36 results between the inlet 24 and the dividing wall 18. The helical blade 30 preferably makes at least two full revolutions, and terminates in an outwardly-flared drip ring 37. The chamber 20 can also be provided with a pressure relief valve 38.

A porous, replaceable coalescing filter 40 is provided in the second filter chamber 22. The coalescing filter 40 receives the oil/refrigerant mixture from the first filter chamber 20 via a gas passage member 42. The drip ring 37 flares outwardly to inhibit the flow of oil onto the gas passage member 42. A baffle member 44 is provided in the second filter chamber 22 between the coalescing filter 40 and the outlet 26. An oil collection area 46 is provided within the chamber 22 in the vicinity of the bottom end cap 14. Oil removed by the filter elements in both chambers is collected in the collection area 46, as will be described in detail hereinbelow. The oil collection area 46 is provided with an oil drain 48, and can be provided with a level switch 50 that can be used to signal actuation of a pumping mechanism (not shown) for removing oil from the collection area 46.

Oil which has been collected on the mesh screen 34 and which has dripped from the screen passes through an oil drain aperture 52 formed in the dividing wall 18. An oil drain mechanism 54 is secured to the dividing wall to receive oil from the oil drain aperture 52. The oil drain mechanism 54 includes a tapered or funnel-shaped oil drain 56 converging from a first end adjacent to the oil drain aperture to a second, open end. A bracket 58 is provided to secure the funnel-shaped oil drain 56 to the oil separator housing 12. A regulated valve assembly 60 controls the flow of oil from the oil drain 56. The valve assembly 60 includes a ball valve element 62 secured to a guide rod 64 that is mounted for reciprocation on the bracket 58. A resilient member, shown here in the form of a spring 66 concentrically surrounding the guide rod 64, biases the ball valve element 62 towards seating engagement with a valve seat 68 disposed at the bottom of the oil drain 56.

Due to a pressure drop across the coalescing filter 40, the pressure in the first filter chamber 20 is higher than the pressure in the second filter chamber 24. When oil within the oil drain 56 reaches a predetermined level 70, the pressure acting on the surface of the oil is sufficient to force the ball valve element 62 out of engagement with the valve seat 68, thus allowing oil to flow from the oil drain 56 to the collection area 46. The funnel shape of the oil drain 56 causes the surface area of the oil within the drain 56 to increase as oil accumulates, thus providing a greater surface area upon which pressure within the first chamber 20 may act. Consequently, the valve assembly 60 is effectively actuated, even when the pressure difference between the two chambers is relatively small. Further, if the rate of oil flow through the system increases, the rise in level of the oil in the funnel will quickly cause the valve to open due to the increasing force on the ball valve element 62 due to the increasing surface area of the oil in the funnel. The spring 66 is selected to have a biasing force such that the ball valve element 62 is returned to seating engagement with the valve seat 66 before all of the oil is drained from the oil drain 56. This arrangement permits only oil to flow through the oil drain 56, and prevents the oil/refrigerant mixture from passing through the oil drain 56. Consequently, all of the oil/refrigerant mixture must pass through the coalescing filter 40 in order to reach the outlet 26.

The coalescing filter 40, as mentioned hereinabove, is replaceable, and can be removed from the oil separator 10 by means of the components illustrated in FIGS. 2 through 4. The top end cap 16 of the oil separator 10 is provided with a removable header plate 72, which is secured to the top end cap 16 by suitable fasteners, such as threaded bolts 74. A header plate gasket 76 provides a seal between the header plate 72 and the top end cap 16.

As shown in FIG. 3, a T-handle 78 extends through the gas passage member 42 and the coalescing filter 40, and is removably secured to the filter 40 by means of a suitable fastener, such as a wing nut 80. The gas passage member 42 is secured to an upper end of the coalescing filter 40, and includes a cylindrical wall 82 which is provided with gas passage holes 84. The cylindrical wall 82 is closed by a cap 86. As can be seen in FIG. 1, the handle member 78 extends from the filter 40, through the central annular cylindrical passage 32 of the static auger, to a position adjacent to the header plate 72. As can be seen in FIG. 4, when in its installed position, the filter 40 is held in sealed relationship with the dividing wall 18 by means of contact between a mounting flange 88 secured to the dividing wall and a mounting ring 90 secured to the filter and the gas passage member 42. A replaceable O-ring 94 provides a seal between the mounting ring 90 and the flange 88.

In order to replace the coalescing filter 40, the header plate 72 is removed from an access opening 96 at the top end cap 16 of the oil separator 10. An operator then grasps the T-handle 78, and uses the T-handle to affect a slight twisting and pulling motion to remove the filter element from the second filter chamber 22, through the first filter chamber 20, via the central annular cylindrical passage 32. In this regard, the cylindrical passage 32 is provided so as to have a diameter that is slightly greater than the diameter of the mounting ring 90.

Once the filter has been removed, the used filter element can be removed from the end of the handle member, and replaced with a fresh filter element. The operator then uses the handle member to insert the fresh filter element into the second chamber through the access opening via the passage, after which the header plate 72 is resecured to the top end cap 16. When the filter is in its installed position, the top of the T-handle 78 slightly touches the underside of the header plate 72, thus exerting a slight downward pressure on the filter 40 and the mounting ring 90 to ensue proper placement and sealing.

Although the present invention has been described with reference to a specific embodiment, those of skill in the art will recognize that changes may be made thereto without departing from the scope and spirit of the invention as set forth in the appended claims.

I claim as my invention:

1. A multi-stage device for separating oil from a gas, said device comprising:
    a generally cylindrical, vertical-axis housing forming a peripheral wall of said device;
    a top end cap;
    a bottom end cap;
    a dividing wall disposed within said housing so as to divide said device into an upper chamber and a lower chamber, said dividing wall including an oil drain aperture;
    a gas passage member disposed between said upper and lower chambers;
    a helical wall formed within said upper chamber above said gas passage member;
    a porous, replaceable coalescing filter disposed within said lower chamber below said gas passage member;
    a gas inlet opening into said upper chamber;
    a gas outlet opening out of said lower chamber; and
    an oil collection area disposed at a lower end of said lower chamber;
    whereby gas entering said device flows axially along said helical wall, through said gas passage member into said coalescing filter, and out of said device.

2. A device according to claim 1, further comprising filter removal means, disposed in said upper chamber, for facilitating removal of said coalescing filter from said device.

3. A device according to claim 2, wherein said filter removal means comprises:
    a header plate removably secured to said top end cap;
    a central annular cylindrical passage concentrically surrounded by said helical wall within said upper chamber, said passage having an inner diameter that is slightly larger than an outer diameter of said coalescing filter; and
    an elongate handle member having a first end secured to said coalescing filter and a second end disposed adjacent to said header plate.

4. A device according to claim 3, wherein said filter removal means further comprises:
    an annular mounting flange secured in said dividing wall;
    a mounting ring secured to an upper end of said coalescing filter, said ring being concentrically securable within said mounting flange when said coalescing filter is mounted within said housing; and
    an O-ring disposed in sealing engagement with said mounting ring and said mounting flange.

5. A device according to claim 1, wherein said gas passage member comprises:
    a generally cylindrical wall having a closed upper end and a lower end secured to said coalescing filter; and
    at least one gas passage hole formed in said generally cylindrical wall.

6. A device according to claim 1, further comprising an oil drain mechanism secured to said dividing wall to receive oil from said oil drain aperture of said dividing wall.

7. A device according to claim 6, wherein said oil drain mechanism comprises:
    a funnel-shaped oil drain converging from a first end adjacent said oil drain aperture to a second open end; and
    a valve assembly adapted to selectively permit oil to flow from said second end of said funnel-shaped oil drain to said oil collection area in said lower chamber.

8. A device according to claim 7, wherein said valve assembly comprises:
    a valve seat formed on said second end of said funnel-shaped oil drain;
    a ball valve element adapted for selective sealing engagement with said valve seat; and
    resilient means for biasing said ball valve element toward said valve seat.

9. A device according to claim 8, wherein said valve assembly further comprises:
    a bracket secured to said housing; and
    a valve guide rod secured to said ball valve element, said guide rod being supported for reciprocation by said bracket;
    wherein said resilient means comprises a spring disposed between said ball valve element and said bracket, said spring concentrically surrounding said guide rod.

10. A device according to claim 1, further comprising a baffle member disposed in said lower chamber between said coalescing filter and said gas outlet.

11. A device according to claim 1, further comprising a relief valve secured to said housing in communication with said upper chamber.

12. In a multi-stage device for separating oil from a gas, a removable filter arrangement comprising:
    a first chamber including an access opening, said first chamber containing a first filter element;
    a second chamber adjacent to said first chamber, said second chamber containing a second, replaceable filter element;
    a passage formed in said first chamber, said passage leading from said second chamber to said access opening in said first chamber; and
    filter removal means disposed in said first chamber for facilitating removal of said second filter element;
    whereby said second, replaceable filter element can be removed from said second chamber through said access opening via said passage.

13. A filter arrangement according to claim 12, wherein said filter removal means comprises an elongate handle member having a first end secured to said second filter element and a second end disposed adjacent to said access opening.

14. A filter arrangement according to claim 12, wherein said filter removal means comprises a header plate removably secured in selective covering relation to said access opening.

15. A filter arrangement according to claim 12, wherein said first filter element comprises a helical wall and a peripheral screen, and said second filter element comprises a replaceable coalescing filter.

16. A multi-stage device for separating oil from a gas comprising:
    a housing forming a peripheral wall of said device;

a dividing wall disposed within said housing to divide said device into a first chamber and a second chamber;

means for separating oil from a gas in each chamber;

means for collecting said separated oil in each chamber;

communication means between said chambers to allow separated oil in a first of said chambers to flow into a second of said chambers; and valve means operatively associated with said communication means for permitting said flow of oil from said first chamber to said second chamber to occur only upon the occurrence of a selected condition.

17. A device according to claim 16, wherein said valve means includes means for preventing the flow of gas therethrough.

18. A device according to claim 16, wherein said communication means comprises a funnel-shaped oil drain converging from a first open end adjacent said separating wall to a second open end, and said valve means comprises a valve assembly adapted to selectively permit oil to flow from said second end of said funnel-shaped oil drain to an oil collection area in said second chamber.

19. A device according to claim 18, wherein said valve assembly comprises:

a valve seat formed on said second end of said funnel-shaped oil drain;

a ball valve element adapted for selective sealing engagement with said valve seat; and resilient means for biasing said ball valve element toward said valve seat.

20. A device according to claim 19 wherein said valve assembly further comprises:

a bracket secured to said housing; and a valve guide rod secured to said ball valve element, said guide rod being support for reciprocation by said bracket;

wherein said resilient means comprises a spring disposed between said ball valve element and said bracket, said spring concentrically surrounding said guide rod.

* * * * *